(12) United States Patent
Purdy et al.

(10) Patent No.: US 7,330,216 B2
(45) Date of Patent: Feb. 12, 2008

(54) HANDHELD ELECTRONIC DEVICE HAVING A BATTERY COMPARTMENT DOOR THAT INCLUDES A CAMERA

(75) Inventors: Michael Lorne Purdy, Cambridge (CA); Steven R. Green, Waterloo (CA); Roman P. Rak, Waterloo (CA); Alexander I. Bersenev, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 724 days.

(21) Appl. No.: 10/785,634

(22) Filed: Feb. 24, 2004

(65) Prior Publication Data

US 2005/0185090 A1    Aug. 25, 2005

(51) Int. Cl.
*H04N 5/225* (2006.01)
(52) U.S. Cl. .................. 348/375; 348/221.1; 348/372; 348/207.99
(58) Field of Classification Search ................ 348/375, 348/207.99, 376, 455, 211.1, 561, 370; 455/557; 361/814
See application file for complete search history.

(56) References Cited

U.S. PATENT DOCUMENTS

| 5,506,617 | A | | 4/1996 | Parulski et al. |
| 5,634,675 | A | * | 6/1997 | Mo .............................. 292/80 |
| 5,869,204 | A | * | 2/1999 | Kottke et al. ................ 429/100 |
| 6,505,774 | B1 | * | 1/2003 | Fulcher et al. ............... 235/381 |
| 6,616,277 | B1 | * | 9/2003 | Davenport ................... 351/221 |
| 6,660,427 | B1 | * | 12/2003 | Hukill et al. .................. 429/97 |
| 6,876,543 | B2 | * | 4/2005 | Mockridge et al. .......... 361/679 |
| 6,992,699 | B1 | * | 1/2006 | Vance et al. ............ 348/207.99 |
| 2002/0013161 | A1 | | 1/2002 | Parulski et al. |
| 2003/0078082 | A1 | | 4/2003 | Su |
| 2003/0122957 | A1 | * | 7/2003 | Emme ........................ 348/370 |
| 2004/0009789 | A1 | | 1/2004 | Park et al. |

* cited by examiner

*Primary Examiner*—Tuan Ho
*Assistant Examiner*—Usman Khan
(74) *Attorney, Agent, or Firm*—Grant E. Coffield; Brij K. Agarwal; Eckert Seamans Cherin & Mellott, LLC

(57) ABSTRACT

An improved handheld electronic device includes an improved battery compartment door having a miniature camera disposed thereon. The battery compartment door with its camera advantageously does not alter the form factor of the handheld electronic device and can easily be replaced with a similar battery door without a camera which, when installed on the handheld electronic device, will provide the same form factor. A battery compartment of the handheld electronic device is configured to be larger than required to accommodate a battery of the handheld electronic device in order to also accommodate the camera of the battery compartment door.

20 Claims, 5 Drawing Sheets

HANDHELD ELECTRONIC DEVICE HAVING A BATTERY COMPARTMENT DOOR THAT INCLUDES A CAMERA

BACKGROUND OF THE INVENTION

1. Field of the Invention

The invention relates generally to handheld electronic devices and, more particularly, to a handheld electronic device including a removable battery compartment door and a camera.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices or that can be selectively communicated, such as through the use of detachable wires.

Since handheld electronic devices desirably are portable, it is also desirable that the form factor of the devices be sufficiently small and ergonomic that the devices can be easily transported with convenience, such as with a belt clip, in a user's pocket, manually, or in a briefcase. Ergonomics and ease of use are of paramount importance in a handheld electronic device, and the user of a handheld electronic device typically will not use accessories or functions of the device that are not ergonomically configured or that are not easy to use, which is undesirable. As technology advances, therefore, accessories and functions that are added to handheld electronic devices must be of an ergonomic and easy to use nature or will be of limited value in the context of a handheld electronic device.

Certain features of handheld electronic devices can be undesirable in certain contexts. For instance, many handheld electronic devices include a miniature camera that can take photos which are then stored in memory resident on the handheld electronic device or can be transmitted to another device using wireless communication. Cameras typically are not permitted to be brought into research facilities and other facilities that are secure or that are otherwise restricted. A handheld electronic device is desirably kept with the user at all times to serve its intended purpose. However, if a user of a handheld electronic device must enter a secure facility without the handheld electronic device, the utility of the handheld electronic device is severely hampered.

The ergonomics of a given handheld electronic device are largely dictated by the form factor of the handheld electronic device. The "form factor" of a handheld electronic device refers broadly to the size and shape of the handheld electronic device and can include the various ergonomic contours of the exterior surfaces of the device as well as the external dimensions thereof. The form factor of a given handheld electronic device often can be optimized for a given application, but the addition of accessories often alters the form factor from its previous optimum configuration.

SUMMARY OF THE INVENTION

An improved handheld electronic device and its improved battery compartment door provide these and other aspects of the invention. An improved handheld electronic device includes an improved battery compartment door having a miniature camera disposed thereon. The battery compartment door with its camera advantageously does not alter the form factor of the handheld electronic device and can easily be replaced with a similar battery door without a camera which, when installed on the handheld electronic device, will provide the same form factor. A battery compartment of the handheld electronic device is configured to be larger than required to accommodate a battery of the handheld electronic device in order to also accommodate the camera of the battery compartment door.

Accordingly, an aspect of the invention is to provide an improved handheld electronic device having a battery compartment door that includes a camera and that substantially does not alter the form factor of the handheld electronic device.

Another aspect of the invention is to provide an improved handheld electronic device that can be configured either to include or not to include a camera substantially without altering the form factor of the handheld electronic device.

Another aspect of the invention is to provide an improved handheld electronic device that can have one of two battery compartment doors, one of which includes a camera, and the other of which does not include a camera, with the handheld electronic device having substantially the same form factor regardless of which of the two battery compartment doors is installed thereon.

Another aspect of the invention is to provide an improved battery compartment door that can be used in conjunction with a handheld electronic device and that substantially does not alter the form factor of the handheld electronic device.

Another aspect of the invention is to provide an improved battery door that can be used with a handheld electronic device and that includes a camera, with the improved battery compartment door being interchangeable with a similar battery compartment door that does not include a camera, with such interchanging occurring substantially without altering the form factor of the handheld electronic device.

Another aspect of the invention is to provide an improved handheld electronic device having an improved battery compartment door that includes a camera, with the camera being disposed substantially within the interior of the handheld electronic device and not altering the form factor of the handheld electronic device.

Another aspect of the invention is to provide an improved handheld electronic device having a battery compartment that is larger than required to accommodate a battery in order to also accommodate a camera of a battery compartment door of the handheld electronic device.

Another aspect of the invention is to provide an improved handheld electronic device having sets of accessories and/or features that are tailored to specific environments and that are ergonomic and easy to use. Such an improved handheld electronic device may be configured to permit certain of the accessories to be added or removed depending upon the specific environment.

Another aspect of the invention is to provide an improved handheld electronic device having accessories that can be added or subtracted without meaningfully altering the form factor of the handheld electronic device.

These and other aspects of the invention are provided by an improved compartment door structured to be used with a handheld electronic device of a type having a primary housing portion with a cavity formed therein, the cavity being in communication with an exterior of the primary housing portion, in which the general nature of the compartment door can be stated as including a panel, a camera, and a number of attachment structures. The panel has an inner surface and an outer surface. The camera is mounted to the panel and disposed substantially opposite the outer surface. The attachment structures are disposed on the panel and are structured to cooperate with the handheld electronic device to removably mount the compartment door to the handheld electronic device and to substantially enclose the cavity. The compartment door is structured to cooperate with the primary housing portion to together form a housing of the handheld electronic device, with the inner surface of the panel facing toward the cavity, with the camera being disposed substantially within the cavity, and with the outer surface facing away from the cavity when the compartment door is mounted to the handheld electronic device.

The panel may be structured such that the outer surface thereof is disposed substantially flush with an exterior surface of the primary housing portion adjacent the cavity when the compartment door is mounted to the handheld electronic device. The compartment door may be a battery compartment door and may be structured to additionally enclose a battery of the handheld device within the cavity.

Other aspects of the invention are provided by an improved handheld electronic device, the general nature of which can be stated as including a housing and a battery disposed on the housing. The housing has a compartment door and a primary housing portion having an exterior and a cavity formed therein, with the cavity being in communication with the exterior of the primary housing portion. The compartment door has a panel and a camera. The panel has an inner surface and an outer surface, and the camera is mounted to the panel and disposed substantially opposite the outer surface. The compartment door is removably mounted to the primary housing portion and substantially encloses the cavity. The inner surface of the panel faces toward the cavity. The camera is disposed substantially within the cavity. The outer surface faces away from the cavity.

The primary housing portion may include an exterior surface, and the outer surface of the panel may be disposed substantially flush with the exterior surface of the primary housing portion adjacent the cavity. The battery may disposed in the cavity, and the compartment door may be a battery compartment door that may enclose the battery within the cavity.

BRIEF DESCRIPTION OF THE DRAWINGS

A further understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
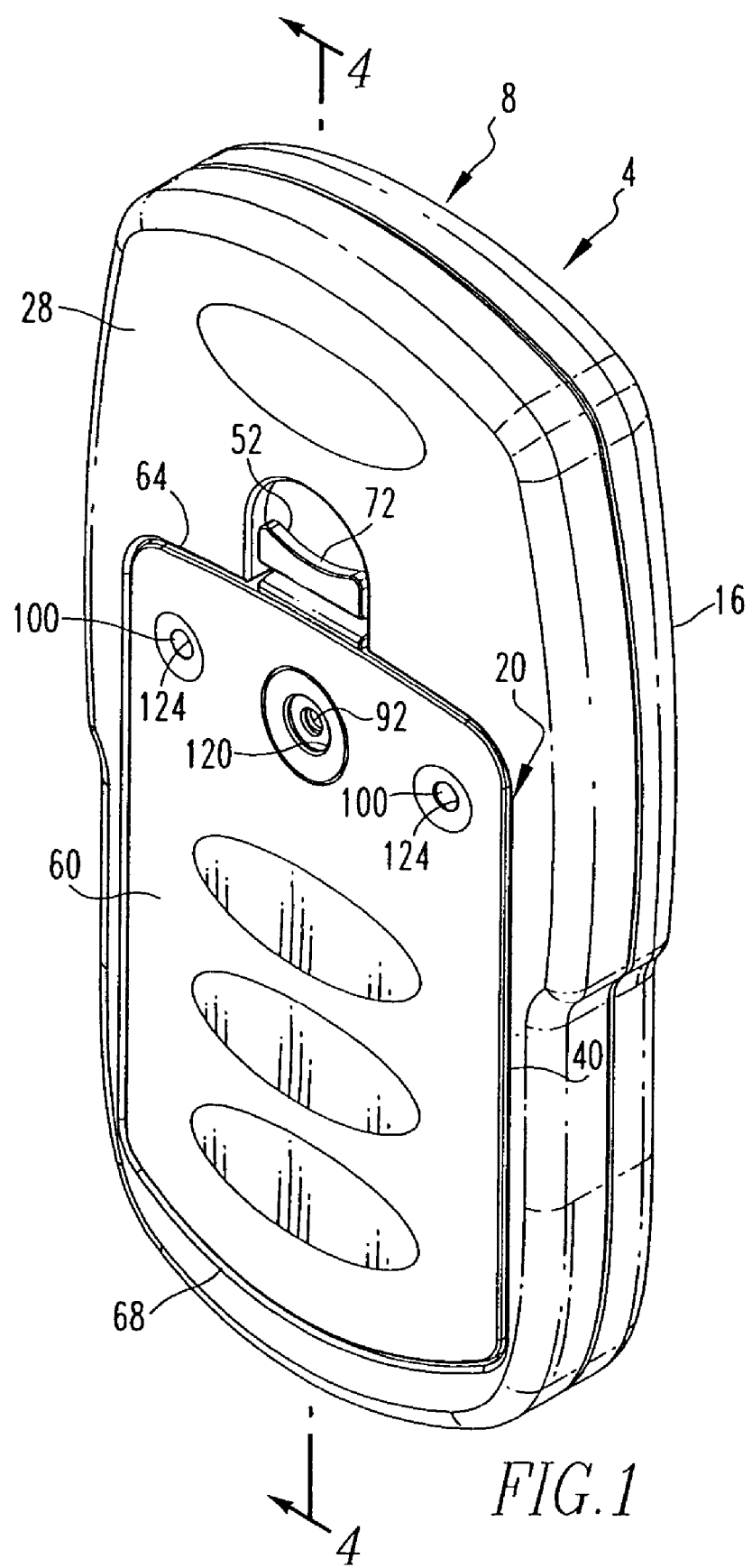
FIG. 1 is an isometric view of an improved handheld electronic device in accordance with an aspect of the invention and including an improved compartment door in accordance with another aspect of the invention.
Figure 2:
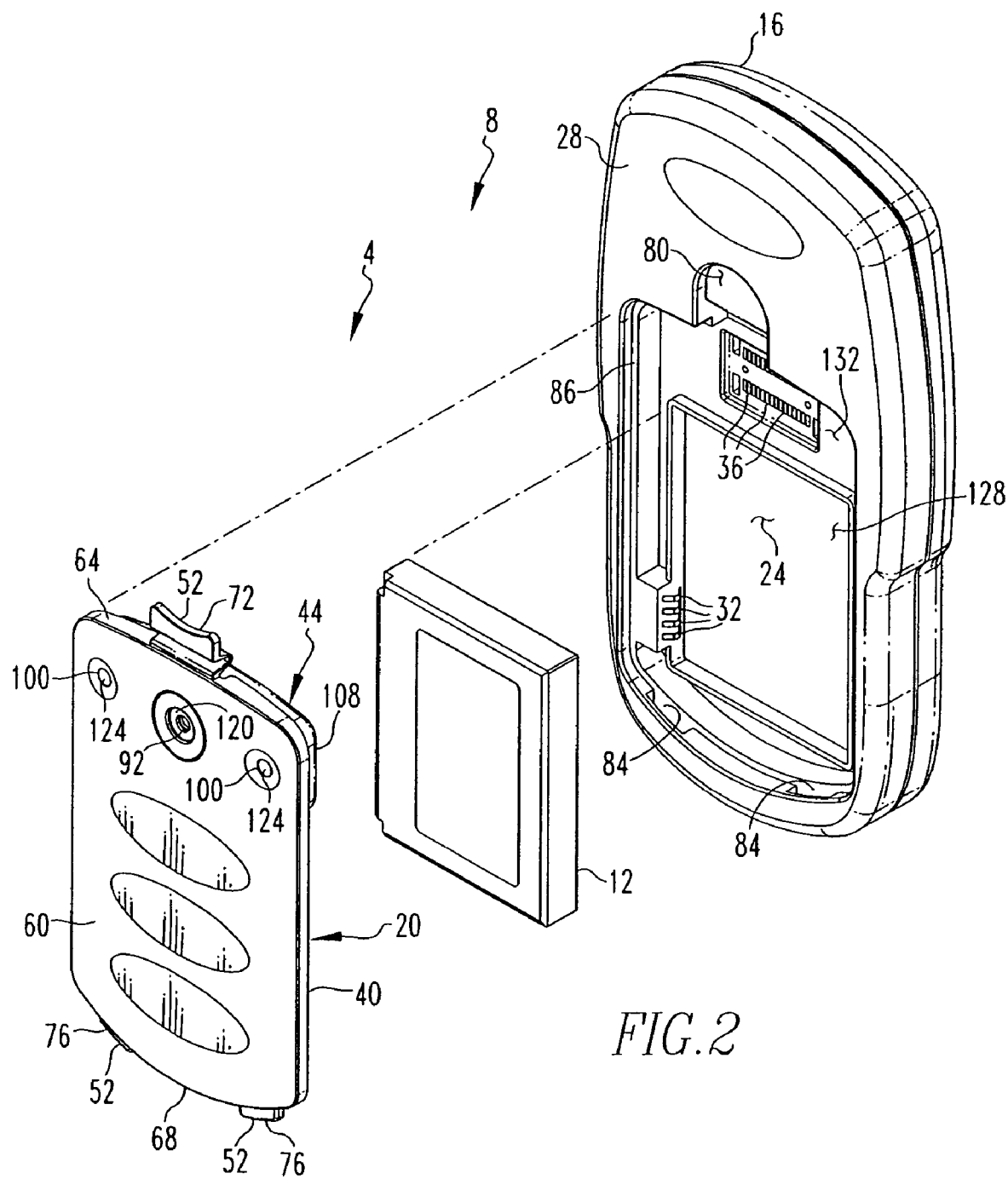
FIG. 2 is an exploded isometric view of the improved handheld electronic device of FIG. 1.
Figure 3:
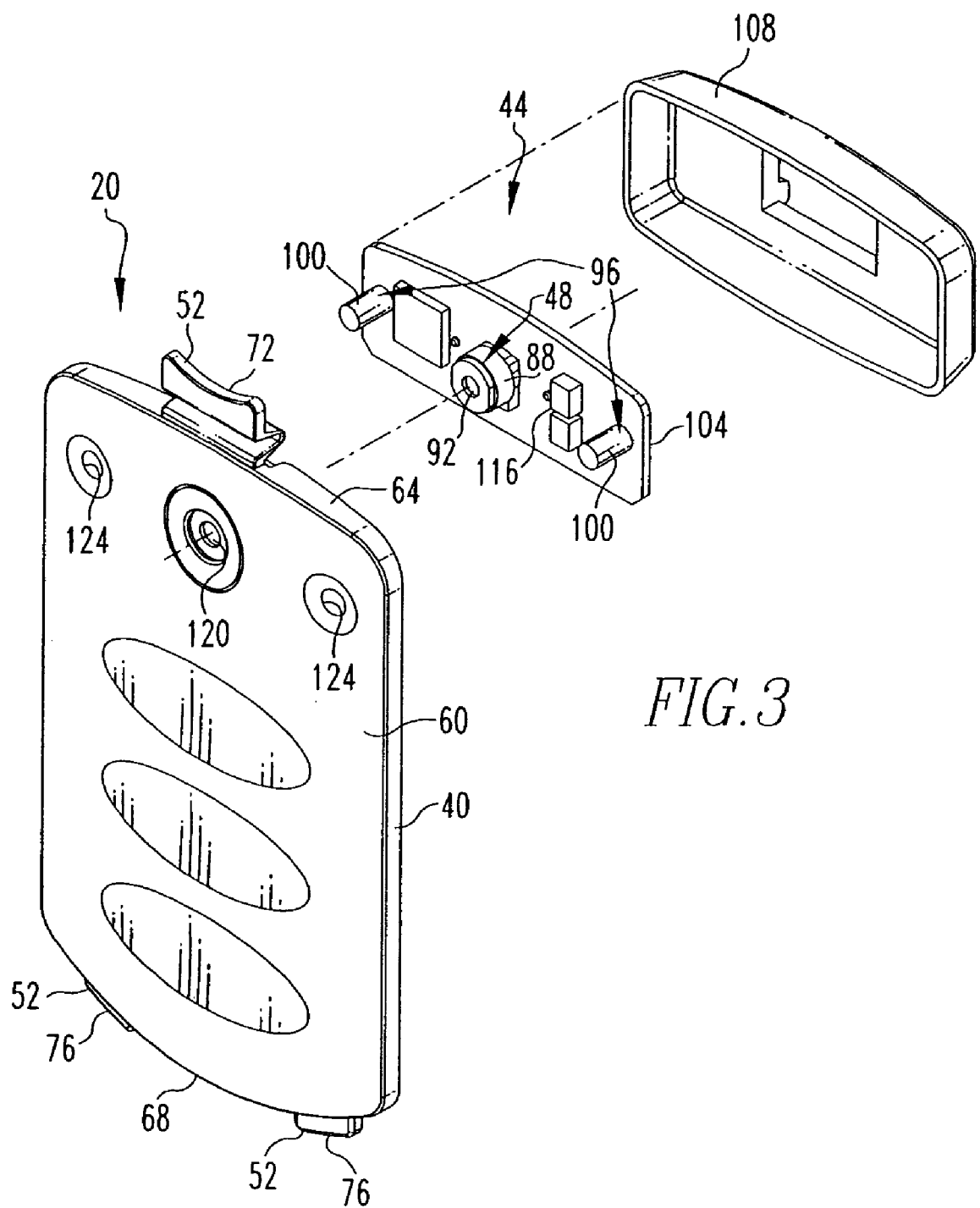
FIG. 3 is an exploded isometric view of the improved compartment door of FIG. 2.
Figure 4:
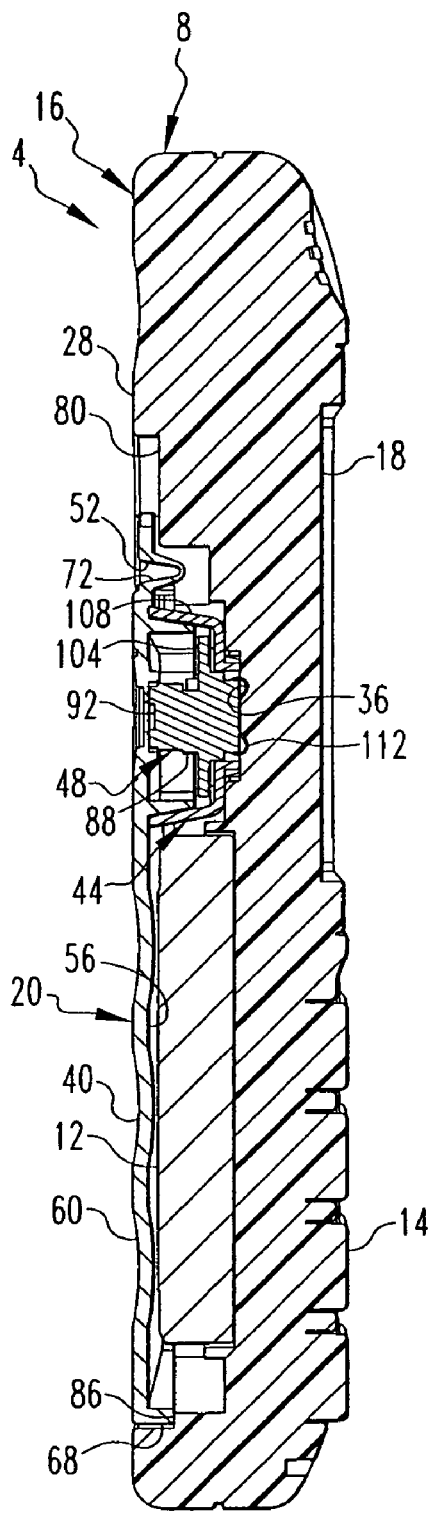
FIG. 4 is a sectional view as taken along Line 4-4 of FIG. 1.
Figure 7:
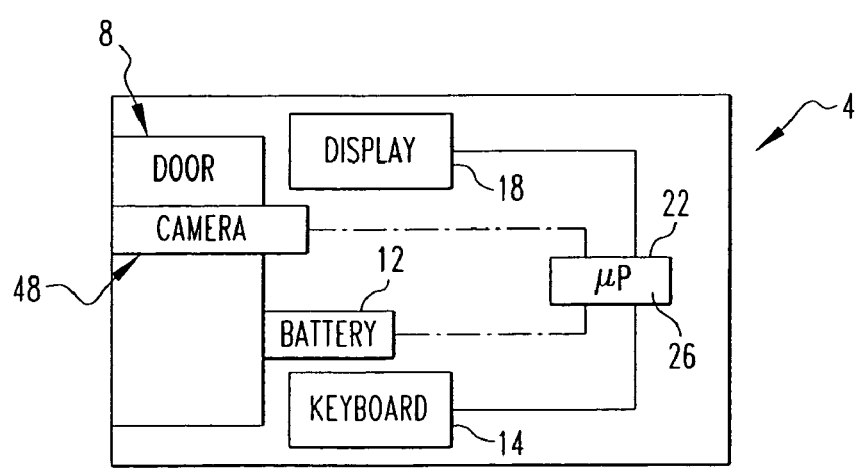
FIG. 7 is a block diagram of the improved handheld electronic device of FIG. 1.

An improved handheld electronic device 4 is depicted generally in FIGS. 1 and 7. FIGS. 2-4 generally depict the device 4 in whole or in part. As is best shown in FIG. 2, the device 4 includes a housing 8 and a battery 12. The exemplary embodiment of the device 4 depicted herein (FIG. 7) also includes a keyboard 14, a display 18, and a processor 22 (e.g., without limitation, a microprocessor μP) having software 26 that resides in the handheld electronic device 4 and that provides functionality to inputs received from the keyboard 14 and provides outputs to the display 18, although it is understood that the teachings provided herein are applicable to handheld electronic devices that are lacking one or more of a keyboard, a display, and a processor. Examples of handheld electronic devices are included in U.S. Pat. Nos. 6,452,588 and 6,489,950 which are incorporated by reference herein.

As can be understood from FIGS. 1 and 2, the handheld electronic device 4, and particularly the housing 8, includes a primary housing portion 16 and a compartment door 20. The compartment door 20 is removably mountable to the primary housing portion 16, and the primary housing portion 16 and the compartment door 20 together make up the housing 8.

The primary housing portion 16 includes a cavity 24 formed therein that is open to the exterior of the housing 8. The battery 12 is receivable in the cavity 24 and is enclosed within the cavity 24 when the compartment door 20 is mounted to the primary housing portion 16 (FIG. 1). It thus can be seen that in the exemplary depicted embodiment of the device 4, the cavity 24 is a battery compartment and the compartment door 20 is a battery compartment door although in other embodiments either could be of other configurations.

The primary housing portion 16 includes an exterior surface 28. The cavity 24 is formed in the exterior surface 28. When the primary housing portion 16 is considered without the cavity 24, i.e., if the primary housing portion 16 did not have the cavity 24 formed therein, the exterior surface 28 can be considered to give a form factor to the primary housing portion 16.

The primary housing portion 16 includes a number of power electrical contacts 32 (FIG. 2) and a number of device electrical contacts 36 within the cavity 24. As used herein, the expression "a number of" and variations thereof shall refer to any non-zero quantity, including a quantity of one. The power electrical contacts 32 are electrically engaged with corresponding contacts (not expressly depicted) on the battery 12 to transmit electrical power between the battery 12 and the housing 8. The device electrical contacts 36 will be described in greater detail below.

The compartment door 20 includes a panel 40, a camera 48 (FIG. 3), and a number of attachment structures 52. The panel 40 includes a support 44 upon which the camera 48 is disposed. The panel 40 is a plate-type member having an inner surface 56 (FIG. 4) and an outer surface 60 opposite one another, and further includes a first end 64 and a second end 68 which, in the depicted embodiment, are opposite one another.

The attachment structures 52 include a deflectably movable latch 72 at the first end 64 and a pair of stationary tangs 76 at the second end 68. The tangs 76 are receivable in a pair of receptacles 84 formed on the primary housing portion 16 within the cavity 24. The latch 72 is cooperably receivable within a recessed region 80 of the primary housing portion 16. When the compartment door 20 is mounted to the primary housing portion 16, meaning that the tangs 76 are received in the receptacles 84, and the latch 72 is lockably engaged with the primary housing portion 16 within the recessed section 80, the panel 40 is disposed against a ledge 86 formed on the primary housing portion 16 within the cavity 24. In the depicted embodiment, the ledge 86 extends substantially about the perimeter of the cavity 24. When the compartment door 20 is mounted to the primary housing portion 16 in such fashion, the compartment door 20 encloses the cavity 24 and encloses the battery 12 within the cavity 24.

As can be understood from FIGS. 1 and 4, when the compartment door 20 is mounted to the primary housing portion 16 in the indicated fashion, the outer surface 60 of the panel 40 is disposed substantially flush with the exterior surface 28 of the primary housing portion 16. It thus can be seen that the configuration of the cavity 24 with its ledge 86 recessed therein permits the panel 40 to be largely disposed recessed within the primary housing portion 16, which permits the flush relationship between the outer surface 60 and the exterior surface 28 in the region of the cavity 24.

It thus can also be seen that the form factor of the primary housing portion 16 without the cavity 24 is substantially unaltered by the compartment door being mounted thereto. Stated otherwise, the compartment door 20 does not alter the form factor of the primary housing portion 16, and rather the compartment door 20 cooperates with and becomes a substantially unaltering portion of the form factor of the primary housing portion 16.

As can be understood from FIG. 3, the camera 48 includes a body 88, a lens 92, and a flash apparatus 96. The support 44 includes a printed circuit board 104 and a bracket 108. The lens 92 is disposed on the body 88, with the body 88 and the flash apparatus 96 being disposed on the printed circuit board 104. The printed circuit board 104 is mounted on the bracket 108 which is, in turn, mounted to the panel 40 at the inner surface 56 (FIG. 4) thereof generally at the first end 64. The camera 48 additionally includes appropriate camera electronics 116 that are shown in block diagram form in FIG. 3 and are disposed on the printed circuit board 104. The printed circuit board 104 additionally includes a number of camera electrical contacts 112 (FIG. 4) that are electrically engaged with the device electrical contacts 36 to transfer power and data between the camera 48 and the primary housing portion 16.

In the depicted embodiment, the flash apparatus 96 includes a pair of white LEDs 100 disposed on the printed circuit board 104. The lens 92 is disposed generally between the white LEDs 100. The panel 40 includes a lens hole 120 formed therein that allows light to pass through the panel 40 and into the camera 48 through the lens 92. The panel 40 additionally includes a pair of LED holes 124 formed therein that permit light produced by the white LEDs 100 to pass through the panel 40 and onto a subject (not shown) being photographed. It thus can be seen that the camera 48 is disposed on the panel 40 and extends away from the panel 40 in a direction generally opposite the outer surface 60.

As can be understood from FIG. 2, the cavity 24 can be considered to include a first cavity portion 128 within which the battery 24 is disposed and a second cavity portion 132 within which the camera 48 and the support 44 are disposed (FIG. 4) when the compartment door 20 is mounted to the primary housing portion 16. The cavity 24, which serves as a battery compartment for the device 4, is configured to be slightly larger than needed to accommodate the battery 12 therein in order to additionally accommodate the camera 48 of the compartment door 20.

Figure 5:
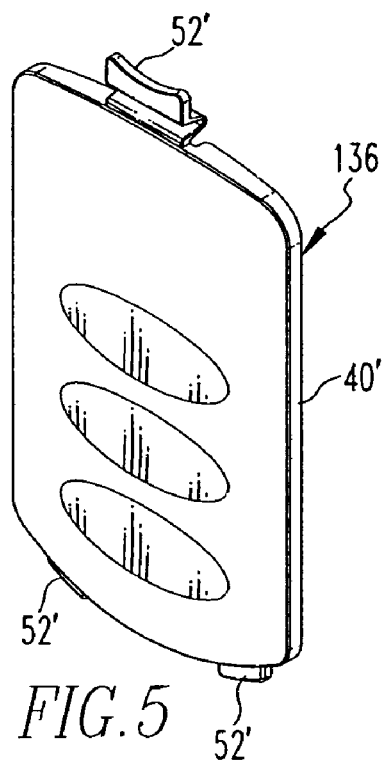
FIG. 5 is an isometric view of a compartment door that can be used with the improved handheld electronic device of FIG. 1.
Figure 6:
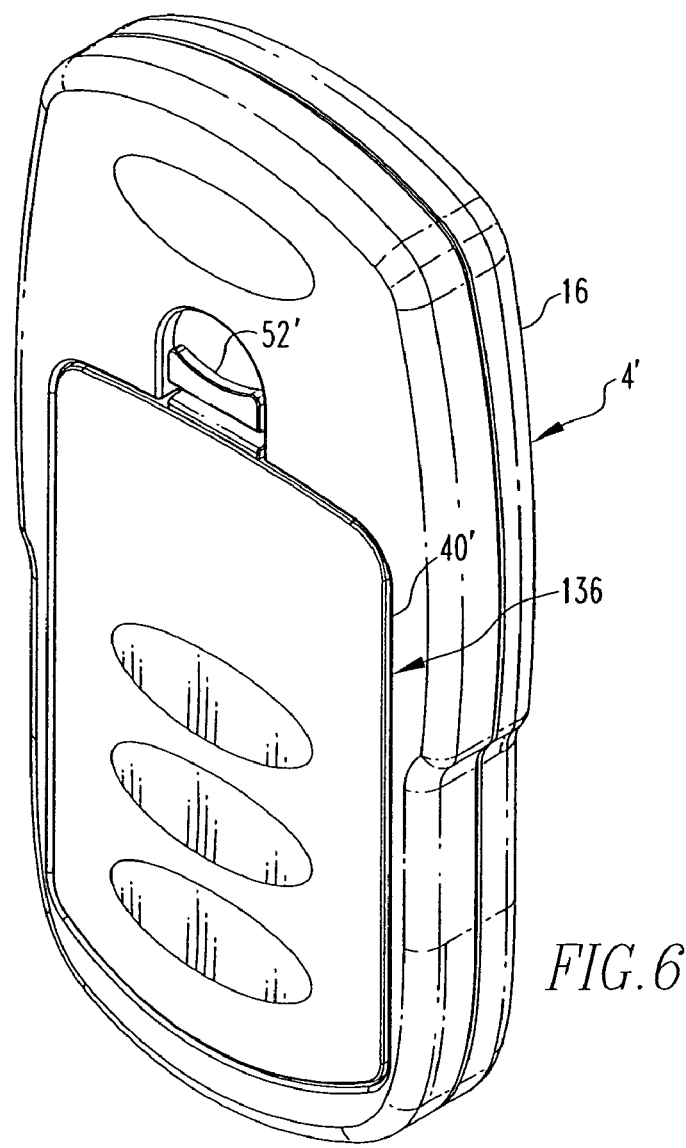
FIG. 6 is an isometric view of the compartment door of FIG. 5 mounted to the handheld electronic device of FIG. 1.

As can be seen from FIG. 4, when the compartment door 20 is mounted to the primary housing portion 16, the camera electrical contacts 112 are electrically engaged with the device electrical contacts 36, and the camera 48 is disposed within the cavity 24. Alternatively, the compartment door 20 with its camera 48 could be interchanged with an alternate compartment door 136 (FIGS. 5-6) having a panel shown as 40' in FIG. 6 and a number of attachment structures 52', but not including a camera or a support. The alternate compartment door 136 mounted to the primary housing portion 16 (FIG. 6) results in a handheld electronic device 4' having substantially the same form factor as the device 4, which includes the camera 48.

It thus can be seen that the improved handheld electronic device 4 includes a removable camera 48, and the presence or absence of the camera 48 does not affect the form factor of the handheld electronic device 4. This is because the camera 48 is mounted to the compartment door 20, which is removable from the handheld electronic device 4 and is replaceable with the alternate compartment door 136 which does not include a camera but provides the same form factor to the handheld electronic device 4 when mounted thereon. The outer surface 60, which faces away from the cavity 24 when the compartment door 20 is mounted to the primary housing portion 16, blends with and is flush with the exterior surface 28 of the primary housing portion 16, such that the compartment door 20 advantageously does not affect or alter the form factor of the primary housing portion 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A compartment door structured to be used with a handheld electronic device of a type having a primary housing portion with a cavity formed therein and having a battery disposed on the primary housing portion and being disposed in the cavity, the cavity being in communication with an exterior of the primary housing portion, the compartment door comprising:

a panel having an inner surface and an outer surface;

a camera mounted to the panel and disposed substantially opposite the outer surface;

a number of attachment structures disposed on the panel and structured to cooperate with the handheld electronic device to mount the compartment door to the handheld electronic device to substantially enclose the cavity, the compartment door being structured to cooperate with the primary housing portion to together form a housing of the handheld electronic device, with the inner surface of the panel facing toward the cavity, with the camera being disposed substantially within the cavity, and with the outer surface facing away from the cavity when the compartment door is mounted to the handheld electronic device, the compartment door being structured to be removable from the primary housing portion and from the battery disposed on the primary housing portion, wherein the exterior of the primary housing portion includes an exterior surface, and wherein the cavity is formed in the exterior surface.

2. The compartment door of claim 1 wherein the panel is structured such that the outer surface thereof is disposed substantially flush with the exterior surface of the primary housing portion adjacent the cavity when the compartment door is mounted to the handheld electronic device.

3. The compartment door of claim 1 wherein the panel includes a first end and a second end, and wherein the attachment structures include a movable latch and at least a first substantially stationary tang, the movable latch being disposed generally at the first end, and the at least a first substantially stationary tang being disposed generally at the second end.

4. The compartment door of claim 1 wherein the compartment door is a battery compartment door and is structured to additionally enclose a battery of the handheld electronic device within the cavity.

5. The compartment door of claim 1 wherein the camera includes a body, a lens, and a flash apparatus, the lens being disposed on the body, and the flash apparatus having at least a first light source disposed adjacent the lens.

6. The compartment door of claim 5 wherein the flash apparatus includes a pair of LEDs, with the lens being disposed generally between the LEDs.

7. The compartment door of claim 1 wherein the panel includes a support disposed on the inner surface, the support including a printed circuit board, with the camera being disposed on the printed circuit board, and with the printed circuit board including a number of first electrical contacts structured to be electrically engaged with corresponding second electrical contacts on the handheld electrical device for powering the camera and for transferring data from the camera to the handheld electronic device.

8. The compartment door of claim 7, wherein the support further includes a bracket disposed on the inner surface of the panel, with the printed circuit board being disposed on the bracket.

9. The compartment door of claim 7, wherein the panel includes an end, and wherein the support is disposed substantially at the end of the panel.

10. A handheld electronic device comprising:

a housing;

the housing having a compartment door and a primary housing portion having an exterior and a cavity formed therein, the cavity being in communication with the exterior of the primary housing portion;

a battery disposed on the primary housing portion and being disposed in the cavity;

the compartment door having a panel and a camera;

the panel having an inner surface and an outer surface;

the camera being mounted to the panel and disposed substantially opposite the outer surface;

the compartment door being mounted to the primary housing portion and substantially enclosing the cavity, the inner surface of the panel facing toward the cavity, the camera being disposed substantially within the cavity, and the outer surface facing away from the cavity; and the compartment door being removable from the primary housing portion and from the battery disposed on the primary housing portion, wherein the exterior of the primary housing portion includes an exterior surface, and wherein the cavity is formed in the exterior surface.

11. The handheld electronic device of claim 10 wherein the outer surface of the panel is disposed substantially flush with the exterior surface of the primary housing portion adjacent the cavity.

12. The handheld electronic device of claim 11 wherein an overall form factor of the primary housing portion ignoring the cavity is substantially unaltered by the compartment door being mounted to the primary housing portion.

13. The handheld electronic device of claim 10 wherein the battery is disposed in the cavity, and wherein the compartment door is a battery compartment door that encloses the battery within the cavity.

14. The handheld electronic device of claim 10 wherein the camera includes a body, a lens, and a flash apparatus, with the lens being disposed on the body, the flash apparatus having at least a first light source disposed adjacent the lens.

15. The handheld electronic device of claim 14 wherein the flash apparatus includes a pair of LEDs, with the lens being disposed generally between the LEDs.

16. The handheld electronic device of claim 10 wherein the panel includes a support disposed on the inner surface, the support including a printed circuit board, with the camera being disposed on the printed circuit board, and with the printed circuit board including a number of first electrical contacts, the primary housing portion including a number of corresponding second electrical contacts, the first electrical contacts and the second electrical contacts being electrically connected together for transferring power to the camera and for transferring data from the camera.

17. The handheld electronic device of claim 16, wherein the support further includes a bracket disposed on the inner surface of the panel, with the printed circuit board being disposed on the bracket.

18. The handheld electronic device of claim 16, wherein the panel includes an end, and wherein the support is disposed substantially at the end of the panel.

19. The handheld electronic device of claim 18, wherein the battery includes an end, and wherein the support is disposed within the cavity substantially between the primary housing portion and the end of the battery.

20. The handheld electronic device of claim 10, wherein the panel includes a first end and a second end, and wherein the compartment door includes a number of attachment structures that are disposed on the panel and are structured to cooperate with the primary housing portion to removably mount the compartment door to the primary housing portion, the attachment structures including a movable latch disposed generally at the first end of the panel and at least a first substantially stationary tang disposed generally at the second end of the panel.

* * * * *